United States Patent [19]
Yasuda et al.

[11] Patent Number: 5,269,273
[45] Date of Patent: Dec. 14, 1993

[54] THROTTLE BODY WITH AN ACTUATOR FOR AUTODRIVE

[75] Inventors: Masanori Yasuda; Sunao Kitamura, both of Obu, Japan

[73] Assignee: Aisan Kogyo Kabushiki Kaisha, Obu, Japan

[21] Appl. No.: 32,486

[22] Filed: Mar. 17, 1993

[30] Foreign Application Priority Data

Mar. 17, 1992 [JP] Japan .................. 4-092212

[51] Int. Cl.⁵ .......................................... F02D 11/10
[52] U.S. Cl. ...................... 123/399; 123/400
[58] Field of Search ............ 123/361, 396, 399, 400, 123/403

[56] References Cited

U.S. PATENT DOCUMENTS

| | | | |
|---|---|---|---|
| 4,961,355 | 10/1990 | Irino et al. | 123/399 X |
| 4,969,437 | 11/1990 | Kolb | 123/399 |
| 5,016,589 | 5/1991 | Terazawa | 123/399 |
| 5,018,496 | 5/1991 | Buchl | 123/399 |
| 5,040,508 | 8/1991 | Watanabe | 123/399 X |
| 5,161,506 | 11/1992 | Mausner et al. | 123/399 |
| 5,161,507 | 11/1992 | Terazawa et al. | 123/399 |
| 5,168,951 | 12/1992 | Sugiura et al. | 123/399 X |

FOREIGN PATENT DOCUMENTS 2-92738  4/1990  Japan .

*Primary Examiner*—Willis R. Wolfe
*Attorney, Agent, or Firm*—Dennison, Meserole, Pollack & Scheiner

[57] ABSTRACT

A throttle body with an autodrive actuator includes an arm and a locking lever each secured to a throttle shaft of a throttle valve, an arm spring for biasing the arm in a valve-closing direction, an accelerator lever rotatably mounted on the throttle shaft, an accelerator lever spring for biasing the accelerator lever, first engaging mechanism engageable between the arm and the accelerator lever, an actuator having an electromagnetic clutch, and a driving motor for rotating an input rotor of the electromagnetic clutch in response to a control signal from a control circuit, and second engaging mechanism engageable between the locking lever and the ouput rotor of the electromagnetic clutch.

4 Claims, 7 Drawing Sheets

THROTTLE BODY WITH AN ACTUATOR FOR AUTODRIVE

BACKGROUND OF THE INVENTION

1. Field of the Invention

The present invention relates to a throttle body to which is assembled an actuator for opening and closing a throttle valve for autodrive. The term "throttle body" is used herein to designate an automotive part to be assembled between an engine and an intake pipe and including a throttle valve and means for opening and closing the throttle valve and the term "autodrive" is used herein to designate a function of keeping an automobile running at a specified constant speed.

2. Description of the Prior Art

Various devices have been proposed to achieve autodrive, and an example of such devices is disclosed in Japanese Laid-Open Patent Publication NO. 2-92738. The device is shown in FIG. 8, in which relay means 93 is used to permit both autodrive and control through an accelerator pedal.

The relay means 93 is mainly composed of three levers 90, 91, 82, each rotatably mounted on a fixed shaft 92. The intermediate lever 91 is so arranged as to rotate in association with rotation of one of the remaining levers 90 or the other lever 82 in a direction shown by an arrow X.

The one lever 90 is connected through a cable 88 to a lever 87 which is rotated by an autodrive actuator 86. The actuator 86 includes a clutch for performing change-over between a disconnected condition wherein the lever 87 can move independently of the actuator 86 and a connected condition wherein the actuator 86 rotates the lever 87.

The other lever 82 is connected to an accelerator pedal 80 through a cable 81. The intermediate lever 91 is connected to a lever 84 through a cable 83. The lever 84 is operable to open and close a throttle valve 89 through a throttle shaft 85. Rotation of the lever 91 in the direction shown by the arrow X causes the throttle valve 89 to be opened.

The device of this arrangement permits change-over between autodrive and control through the accelerator pedal by means of the clutch.

SUMMARY OF THE INVENTION

In the prior art device, the component mainly composed of the autodrive actuator 86, the relay mechanism 93 and the throttle body 94 having the throttle valve 89 and the lever 84 for opening and closing the throttle valve 89 are to be individually assembled to an automobile, and furthermore, connection between these members through cables is required. This tends to reduce assembling efficiency and space efficiency. As the cable 88, the relay mechanism 93 and the cable 83 are interposed between the autodrive actuator 86 and the throttle valve 89, sufficient control accuracy of the throttle valve 89 cannot be achieved.

It is an object of the present invention to improve the assembling efficiency as well as space efficiency.

It is another object of the present invention to provide a simplified arrangement through which the autodrive actuator is connected with the throttle valve so as to improve accuracy of control of the throttle valve by the actuator.

According to the present invention, there is provided a throttle body having an autodrive actuator assembled thereto, which comprises an arm secured to a throttle shaft of a throttle valve for adjusting the amount of intake air into an engine; an arm spring for biasing the arm in a valve-closing direction; an accelerator lever rotatably mounted on the throttle shaft and having an accelerator wire connected thereto so as to transmit the amount of depression of an accelerator pedal; an accelerator lever spring for biasing the accelerator lever in the valve-closing direction; first engaging mechanism engageable when the accelerator lever is rotated in relation to the arm from its initial position in a valve-opening direction; an electromagnetic clutch having input and output rotors rotatably mounted on the throttle shaft coaxially therewith and being brought in contact with and away from each other in response to energization and deenergization of a coil, respectively; an actuator operable in response to a control signal from a control circuit provided for constant speed drive of a vehicle to rotate the input rotor; a locking lever secured to the throttle shaft; and second engaging mechanism engageable when the output rotor is rotated in relation to the locking lever from its initial position in the valve-opening direction.

The throttle body according to the present invention has the autodrive actuator assembled thereto, with no need of assembling any relay mechanism and the actuator separately from the throttle body. Furthermore, there is no cable extending between the autodrive actuator and the throttle valve and thereby little play, resulting in improved accuracy of control of the throttle valve by the actuator.

The present invention will be more fully understood from the following detailed description and appended claims when taken with the drawings.

DETAILED DESCRIPTION OF THE PREFERRED EMBODIMENTS

First Embodiment

Now, a throttle body of a first embodiment according to the present invention will be described with reference to FIG. 1 which is a sectional view thereof.

Figure 2B:
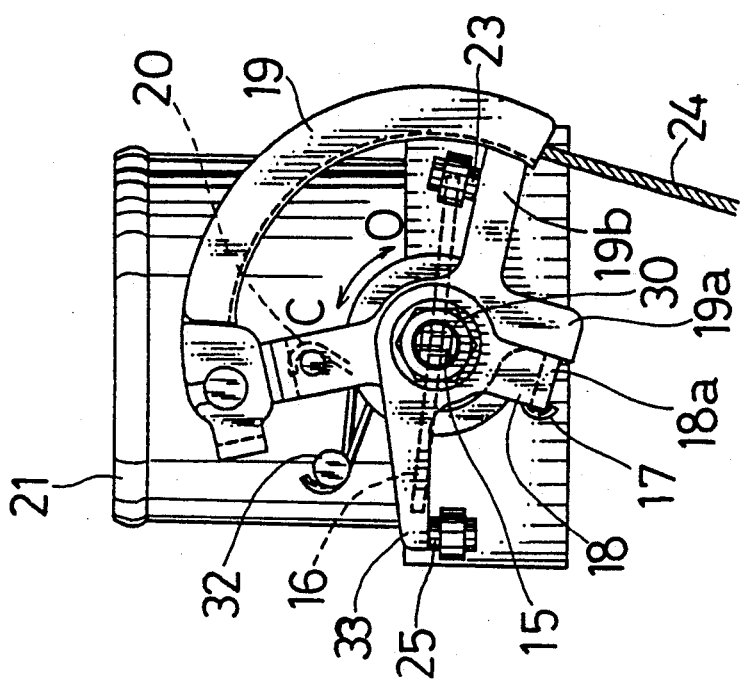
FIGS. 2A and 2B illustrate the throttle body in FIG. 1 with a throttle valve in its closed condition.
Figure 2A:
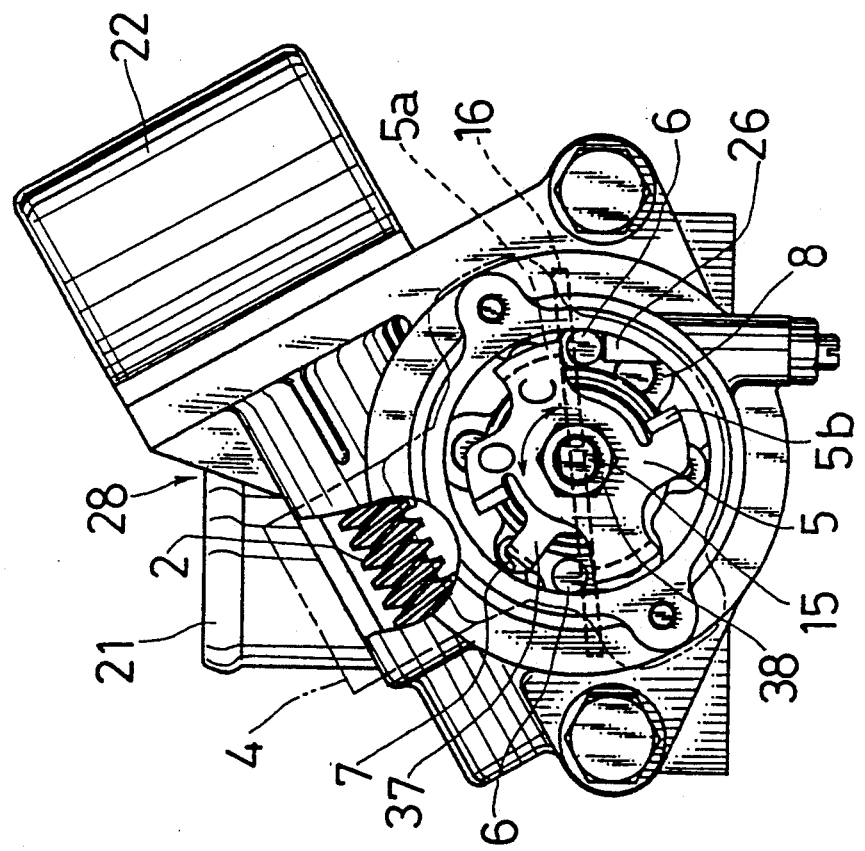

A throttle body 21 in an engine for a vehicle or the like has a throttle shaft 15 rotatably supported thereby. The throttle shaft 15 has a throttle valve 16 secured thereto. In connection with rotation of the throttle shaft 15, the throttle valve 16 opens and closes an intake passage 21a of the throttle body 21 to adjust the amount of intake air into the engine. FIGS. 2A and 2B illustrate the throttle body with the throttle valve 16 in its closed condition, wherein FIG. 2A is a left side view with a throttle sensor removed, and FIG. 2B a right side view.

Figure 1:
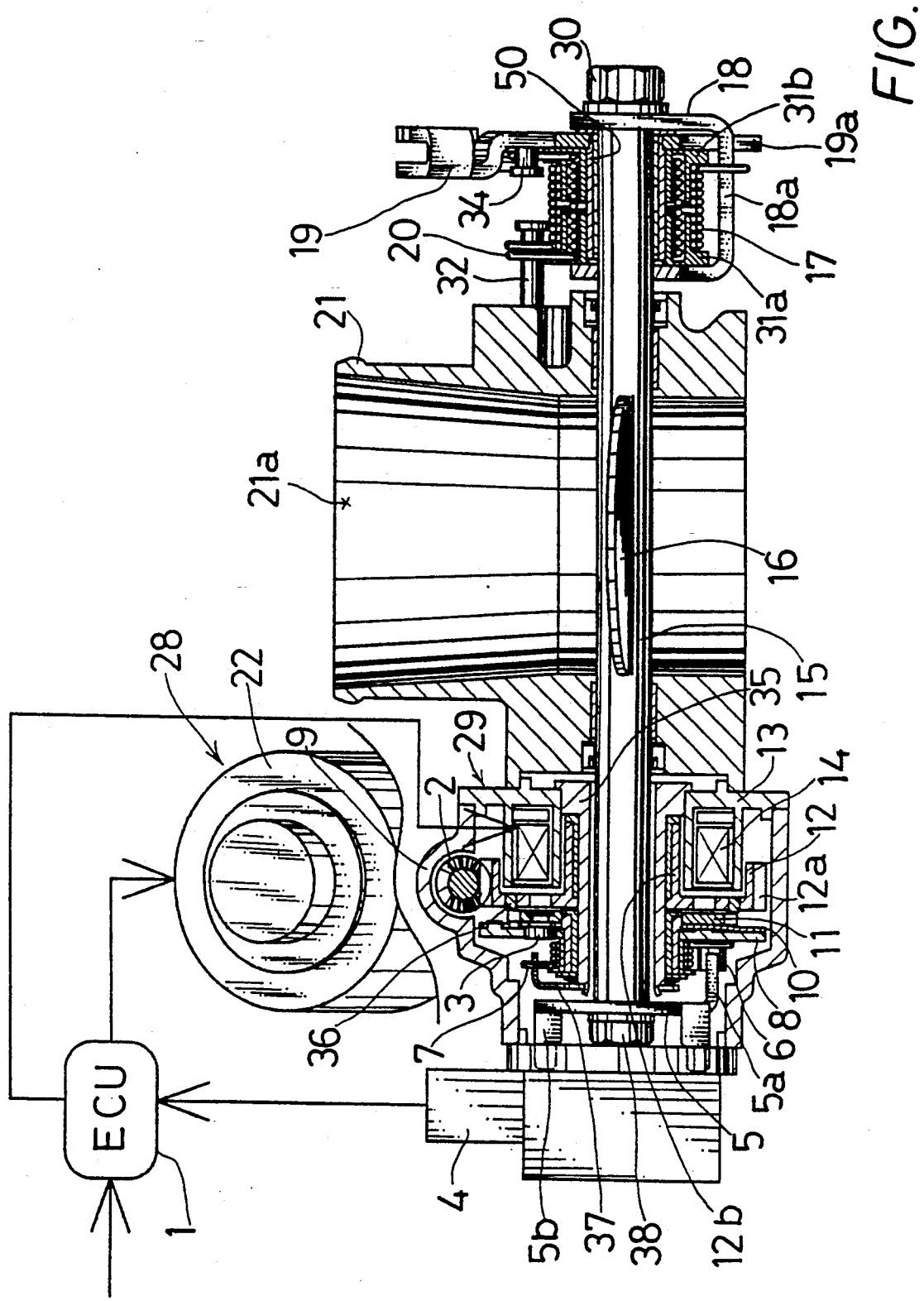
FIG. 1 is a sectional view of a throttle body of a first embodiment according to the present invention.

Referring to FIGS. 1 and FIG. 2B, the throttle shaft 15 has an end extending beyond a right side wall of the throttle body 21 and supporting a substantially U-shaped arm 18 having a base portion 18a and opposite end pieces through which the throttle shaft 15 extends. The arm 18 is fastened to the throttle shaft 15 by a nut 30 and is thus locked on the shaft 15 against rotation.

A pair of left and right spring holders 31a, 31b provided between the opposite end pieces of the arm 18, and an accelerator lever 19 located outside of the right spring holder 31b are journaled on the throttle shaft 15 by means of a bearing 50. The accelerator lever 19 is connected to a distal end of an accelerator wire 24 extending from an accelerator pedal (not shown) disposed on the floor of the driver's seat of the vehicle so as to transmit the amount of depression thereof. In response to the depression of the accelerator pedal, the accelerator wire 24 causes the accelerator lever 19 to rotate in the rightward direction, i.e. in a direction shown by an arrow O in FIG. 2B.

As shown in FIG. 1, disposed between the spring holders 31a, 31b are inner and outer coil springs 20, 17 having different winding diameters. The outer coil spring 17 has an end hooked to a spring retainer pin 32 projecting from the right side wall of the throttle body 21 and the other end hooked to the base portion 18a of the arm 18. This spring 17 (hereinafter referred to as "arm spring") normally biases the arm 18 in a valve-closing direction, i.e. in the leftward direction shown by an arrow C in FIG. 2B.

The arm 18 is provided at the outer end piece thereof with an extension 33, which, when the throttle valve 16 is in its fully closed position, is brought in abutment against a fully closed position arm stopper 25 provided on the side wall surface of the throttle body 21 so as to prevent rotation of the arm 18.

As shown also in FIG. 1, the inner coil spring 20 has an end hooked to the spring retainer pin 32 and the other end hooked to a spring retainer pin 34 projecting from the accelerator lever 19. This spring 20 (hereinafter referred to as "accelerator lever spring") normally biases the accelerator lever 19 in the valve-closing direction.

As shown in FIG. 2B, the accelerator lever 19 has a spoke 19b, which, when the throttle valve 16 is in its fully closed position, is brought in abutment against an initial position accelerator lever stopper 23 provided on the side wall surface of the throttle valve 21 so as to prevent rotation of the accelerator lever 19.

The accelerator lever 19 is further provided with an engaging projection 19a projecting from a boss of the lever 19. When the throttle valve 16 is in its fully closed position, the engaging projection 19a is located on the valve-closing side of the arm base portion 18a, and when the accelerator lever 19 is relatively rotated from the positional relationship with the arm 18 (hereinafter referred to as "initial positional relationship") in the valve-opening direction, the accelerator lever 19 comes in engagement with the arm base portion 18a and causes the arm 18 to be rotated along with the accelerator lever 19. The engaging projection 19a and the arm base portion 18a constitute first engaging means of the present invention.

As shown in FIG. 1, an electromagnetic clutch 29 is mounted on a left side wall of the throttle body 21 coaxially with the throttle shaft 15. An actuator 22 comprising a step motor is disposed above the electromagnetic clutch 29.

The actuator 22 is activated by a control signal from a control circuit I comprising an electronic control unit (ECU) for permitting constant speed drive of the vehicle. The actuator 22 has an output shaft to which is mounted a worm gear 2 in mesh with a worm wheel gear 12 of the electromagnetic clutch 29 which will be mentioned later. The control circuit 1 receives signals from a throttle sensor 4 which will be mentioned later and various other sensors not shown including a vehicle speed sensor for detecting the vehicle speed, an engine speed sensor and a constant speed drive control switch (autodrive switch). In case there is any malfunction in the circuit itself, the actuator 22 or other components, the control circuit 1 generates a malfunction signal to the electromagnetic clutch 29.

Now, the electromagnetic clutch 29 will be described in detail. The electromagnetic clutch 29 includes a clutch stator 13 which is fixed to the throttle body 21. The clutch stator 13 includes therein a coil 14 wound to generate magnetic flux, and a bearing sleeve 35 is press-fitted in the clutch stator 13. The bearing sleeve 35 receives therein the corresponding end of the throttle shaft 15 with a slight clearance therebetween. A worm wheel gear 12 serving as an input rotor and a clutch plate 8 serving as an output rotor are axially positioned and rotatably supported on the bearing sleeve 35.

The worm wheel gear 12 has on the outer periphery thereof gear teeth 12a which are meshed with the worm gear 2 of the actuator 22 and on the inner periphery thereof a tubular portion 12b extending between the clutch stator 13 and the bearing sleeve 35. The worm wheel gear 12 has a clutch pin 36 projecting from the side thereof facing the clutch plate 8 so as to be engaged in a recess formed in a clutch armature which will be mentioned later.

A disc-like clutch spring 10 is attached to a side of the clutch plate 8 facing the worm wheel gear, and the clutch armature 11 is mounted on the spring 10. The clutch armature 11 is prevented from rotation but allowed axial movement by a guide pin 3 attached to the clutch plate 8.

A clutch back spring 7 is disposed at the outer end of the bearing sleeve 35 in such a manner as to be located outside of the clutch plate 8. The spring 7 has an end hooked to a fixed lever 37 attached to the bearing sleeve 35 and the other end hooked to an engaging pin 6 of the clutch plate 8. The clutch back spring 7 normally biases the clutch plate 8 in the valve-closing direction, i.e. in the rightward direction as shown by an arrow C in FIG. 2A.

When no power is supplied to the coil 14 in the electromagnetic clutch 29, the clutch armature 11 is kept apart from the worm wheel gear 12 by the clutch spring 10, so that there occurs no power transmission between the worm wheel gear 12 and the clutch plate 8. When power is supplied to the coil 14, magnetic flux generated thereby causes the clutch armature 11 to be attracted to the worm wheel gear 12 against the biasing force of the clutch spring 10, permitting power transmission between the worm wheel gear 12 and the clutch plate 8 to be achieved. Normally power is supplied to the coil 14 of the electromagnetic clutch 29, and when any malfunction occurs, power supply is stopped in response to a malfunction signal from the control circuit.

Referring to FIGS. 1 and 2A, a locking lever 5 is coaxially mounted on the left end of the throttle shaft 15 and fastened thereto by a nut 38. The locking lever 5 has on the outer periphery thereof a pair of locking pawls 5b projecting outwardly of the body and a pair of engaging pawls 5a projecting toward the body. The locking pawls 5b and the engaging pawls 5a are arranged alternately with each other.

An adapter 9 is attached to the clutch stator 13 so as to cover the mechanical components of the electromagnetic clutch 29. A throttle sensor 4 is disposed at an opening end surface of the adapter 9. The sensor 4 has a detecting element with which the locking pawls 5b of the locking lever 5 are engaged. The throttle sensor 4 detects the opening degree of the throttle valve 16 from the amount of rotation of the throttle shaft 15 and generates a detection signal which is transmitted to the control circuit 1.

The clutch plate 8 has on the outer surface (the left side surface in FIG. 1) thereof a pair of outwardly projecting engaging pins 6 equally spaced from each other. As shown in FIG. 2A, when the throttle valve 16 is in its fully closed position, the engaging pins 6 are located on the valve-closing side of the corresponding engaging pawls 5a of the locking lever 5, and when the clutch plate 8 is relatively rotated from the positional relationship with the locking lever 5 (hereinafter referred to as "initial positional relationship") in the valve-opening direction, the engaging pins 6 come in engagement with the corresponding engaging pawls 5a and cause the lever 5 to be rotated along with the pins 6. The engaging pawls 5a and the engaging pins 6 constitute second engaging means of the present invention.

As shown in FIG. 2A, when the throttle valve is in its fully closed position, one of the engaging pins 6 of the clutch plate 8 is in abutment against an initial position clutch plate stopper 26 to prevent rotation of the plate 8.

When the throttle body of the above construction is in its initial condition in which both the actuator 22 and the electromagnetic clutch 29 are deenergized and the accelerator pedal is not depressed, the throttle valve 16 is in its fully closed position as shown in FIGS. 1, 2A and 2B, and the accelerator lever 19 is in abutment against the initial position stopper 23 under the biasing force of the spring 20, and the clutch plate 8 is in abutment against the initial position stopper 26 under the biasing force of the back spring 7.

When the accelerator pedal is depressed to start the vehicle from the initial condition in the normal drive control, the force applied to depress the pedal is transmitted through the accelerator wire 24 to the accelerator lever 19, causing the lever 19 to be rotated in the direction of the arrow O in FIG. 2B against the biasing force of the accelerator lever spring 20. This brings the engaging projection 19a of the accelerator lever 19 into engagement with the base portion 18a of the arm 18 and then causes the arm 18 to be rotated along with the accelerator lever 19 against the biasing force of the arm spring 17, which, in turn, causes the throttle valve 16 to be opened through the throttle shaft 15 to a throttle opening degree corresponding to the amount of depression of the accelerator pedal.

Figure 3B:
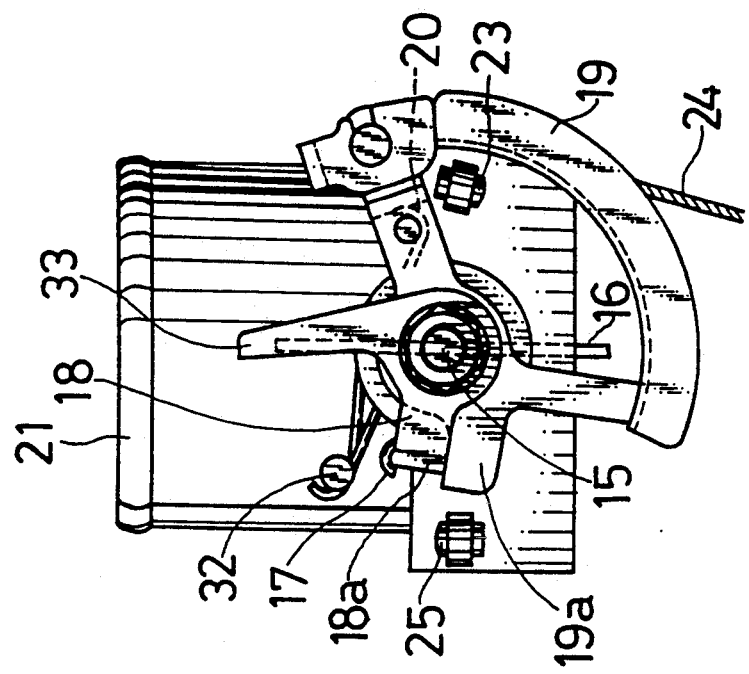
FIGS. 3A and 3B illustrate the throttle body in its normal drive control condition.
Figure 3A:
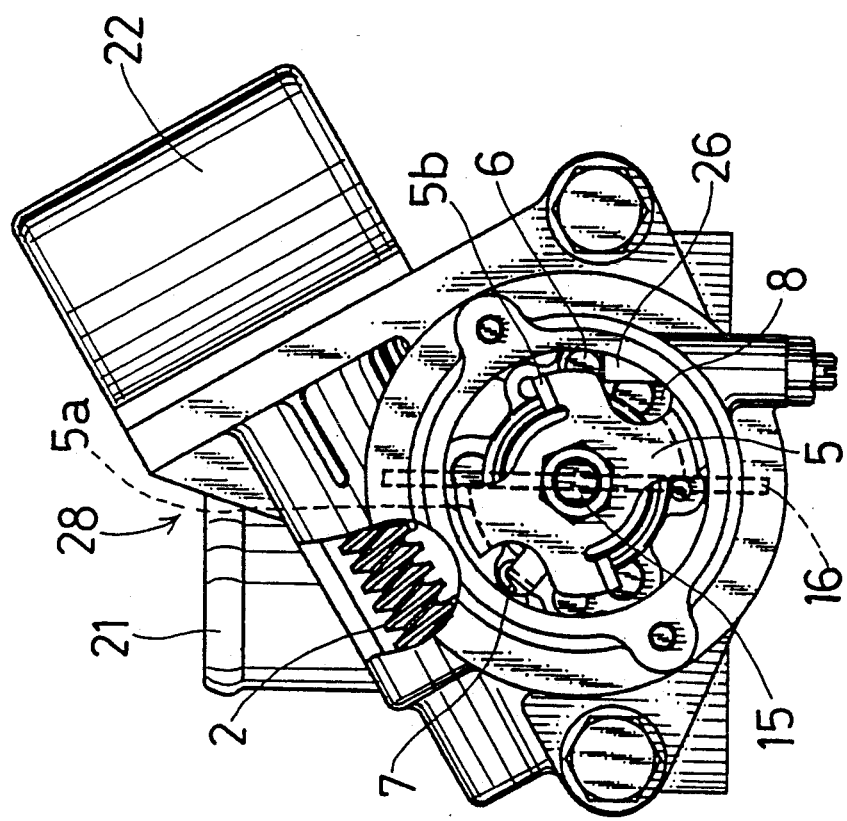

At this time, the locking lever 5 is rotated in the direction of the arrow O in FIG. 2A, and, therefore, the engaging pawls 5a of the lever 5 are moved in the direction apart from the corresponding engaging pins 6 of the clutch plate 8, so that the locking lever produces idle rotation. FIGS. 3A and 3B show the fully opened condition of the throttle valve 16 achieved in connection with depression of the accelerator pedal. FIGS. 3A and 3B are side views corresponding to FIGS. 2A and 2B, respectively.

In case of constant speed drive control in which the accelerator pedal is not depressed but the actuator 22 is used to drive the vehicle, the electromagnetic clutch 29 is energized and the actuator 22 is activated in response to the control signal from the control circuit 1. When the electromagnetic clutch 29 is energized, the clutch armature 11 is attracted to the worm wheel gear 12 against the biasing force of the clutch spring 10. Thus, the driving force of the actuator 22 is transmitted to the worm gear 2, the worm wheel gear 12 and the clutch plate 8 in sequence, causing the clutch plate 8 to be rotated in the direction of the arrow O in FIG. 2A against the biasing force of the clutch back spring 7. This brings the engaging pins 6 of the clutch plate 8 into engagement with the corresponding engaging pawls 5a of the locking lever 5 and then causes the locking lever 5 to be rotated along with the clutch plate 8 against the biasing force of the arm spring 17 and the clutch back spring 7, which, in turn, causes the throttle valve 16 to be opened through the throttle shaft 15 to a throttle opening degree corresponding to the rotational position of the actuator 22.

Figure 4B:
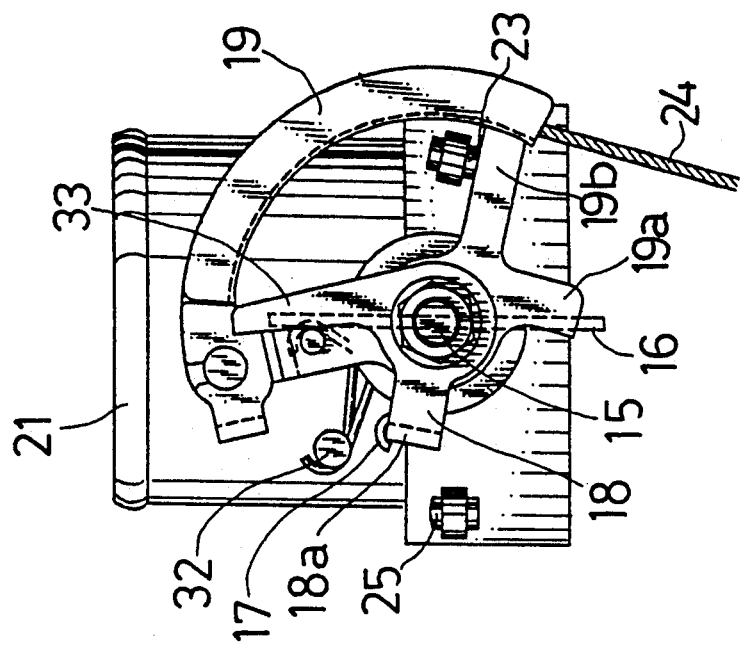
FIGS. 4A and 4B illustrate the throttle body in its constant speed drive control condition.
Figure 4A:
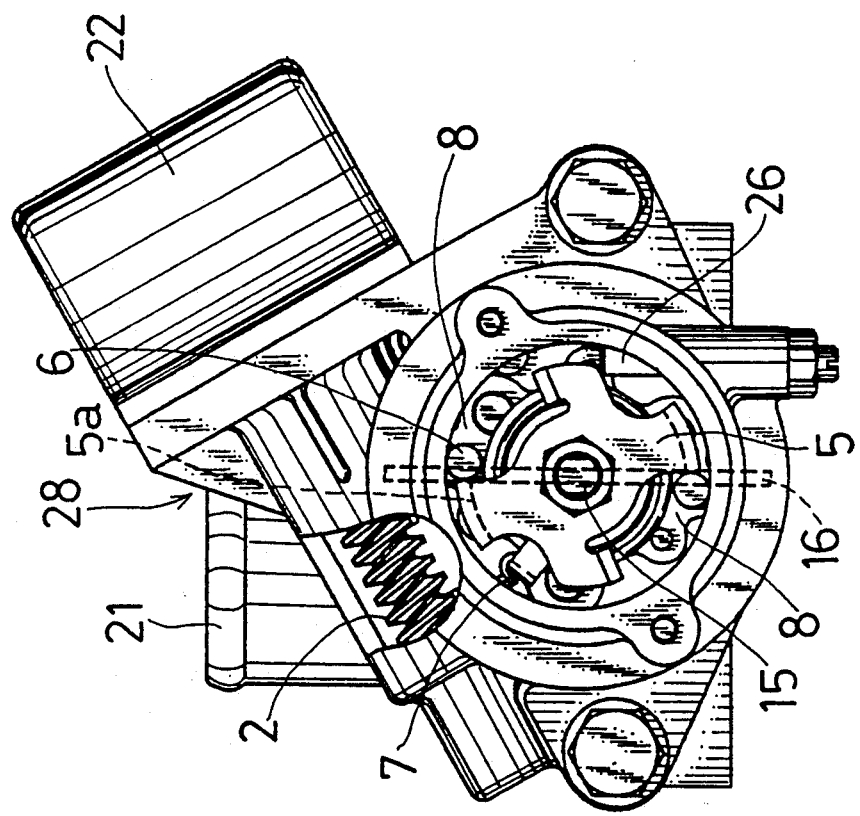

At this time, the arm 18 is rotated in the direction of the arrow O in FIG. 2B, and, therefore, the base portion 18a is moved in the direction apart from the engaging projection 19a of the accelerator lever 19, so that the arm 18 produces idle rotation. FIGS. 4A and 4B show the fully opened condition of the throttle valve 16 operated by the actuator 22. FIGS. 4A and 4B are side views corresponding to FIGS. 2A, 3A and 2B, 3B, respectively.

When the accelerator lever 19 is to be rotated over the throttle opening degree determined by the rotational position of the actuator 22, the lever is relatively rotated in the valve-opening direction (in the direction of the arrow O in FIG. 2B) from the initial positional relationship to the arm 18, and the engaging projection 19a of the accelerator lever 19 is brought in engagement with the base portion 18a of the arm 18. Thus, the throttle valve 16 is opened to a throttle opening degree corresponding to the amount of depression of the accelerator pedal as is the case of the above mentioned normal drive control.

When the clutch plate 8 is to be rotated by the actuator 22 over the throttle opening degree corresponding to the amount of depression of the accelerator pedal, the plate 8 is relatively rotated in the valve-opening direction (in the direction of the arrow O in FIG. 2A) from the initial positional relationship with the locking lever 5, and the engaging pins 6 of the clutch plate 8 are brought in engagement with the corresponding engaging pawls 5a of the locking lever 5. Thus, the throttle valve 16 is opened to a throttle opening degree corresponding to the rotational position of the actuator 22.

If any malfunction occurs in the actuator 22, the control circuit 1 or other components, a malfunction signal is outputted from the control circuit 1 to cause the electromagnetic clutch 29 to disconnect the power transmission, and consequently the throttle valve 16 is returned to its fully closed position by the arm spring 17, irrespective of the condition of the actuator 22. In this case, the throttle valve 16 may be opened by the depression of the accelerator pedal.

In the throttle body of this construction, the throttle shaft 15 supports thereon the accelerator lever 19 and the arm 18 engageable with the accelerator lever 19 through the first engaging means comprising the engaging projection 19a and the arm base portion 18a, and the throttle shaft 15 also supports thereon the electromagnetic clutch 29 and the locking lever 5 engageable with the clutch plate 8 through the second engaging means comprising the engaging pins 6 and the engaging pawls 5a. Thus, the components can be simply and collectively arranged around the throttle shaft.

Further, as rotation of the clutch plate 8 of the electromagnetic clutch 29 is directly transmitted to the throttle shaft 15 by the locking lever 5, there occurs almost no hysteresis between the clutch plate 8 and the throttle shaft 15.

Second Embodiment

Figure 5:
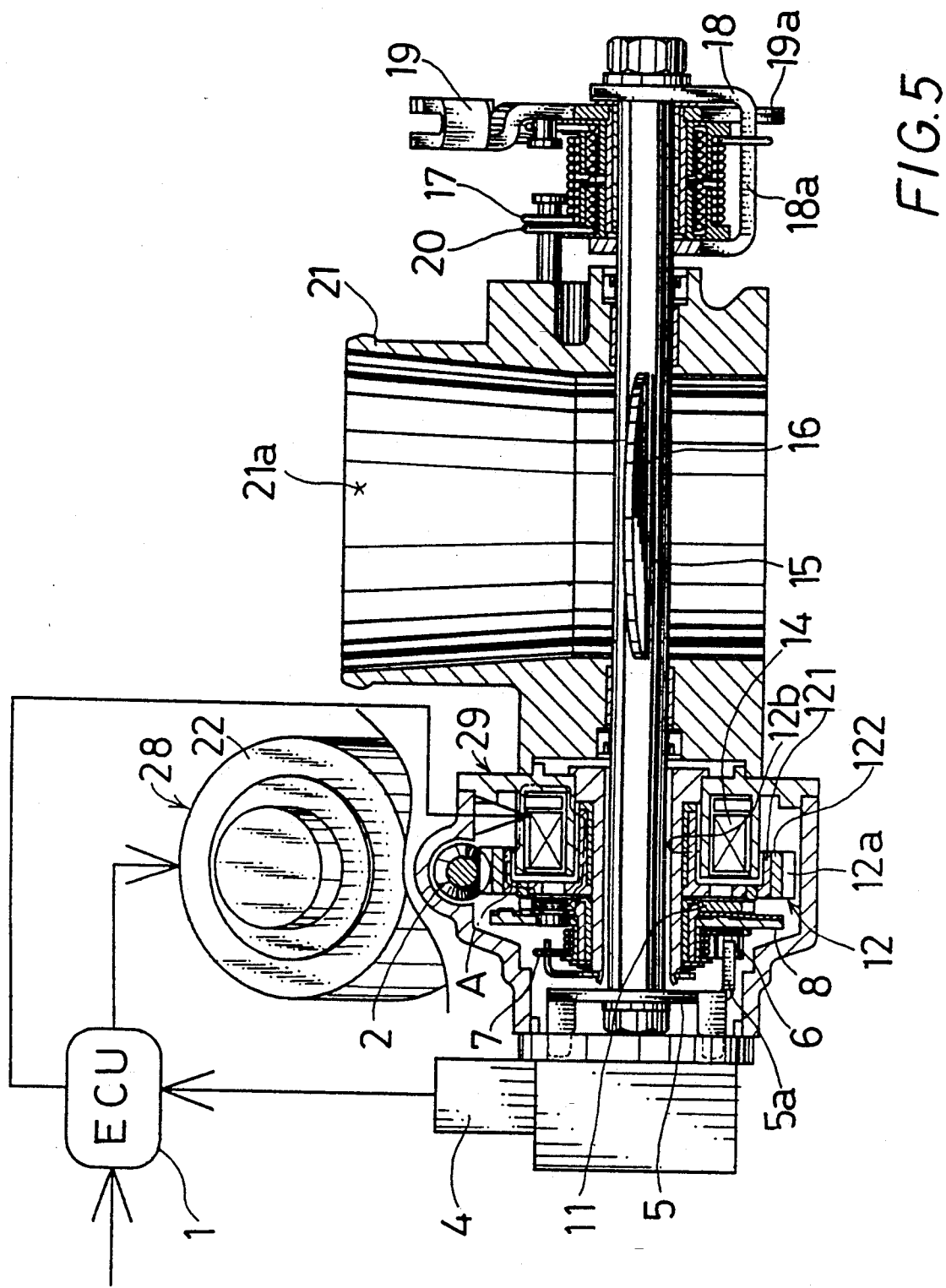
FIG. 5 is a sectional view of the throttle body of a second embodiment according to the present invention.

Now, a second embodiment of the throttle body will be described with reference to FIG. 5 illustrating a sectional view thereof. As this embodiment is a modification of a part (worm wheel gear 12) of the first embodiment, only the differences in the part will be specifically described. Essential parts similar or equivalent to the parts in the first embodiment are given like reference numerals and any further description will be omitted.

Figure 6:
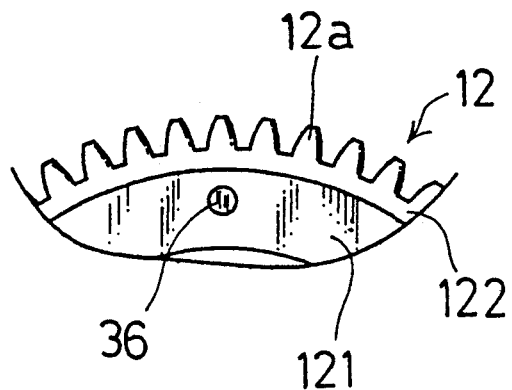
FIG. 6 is a side view of a part of a worm wheel gear.
Figure 7:
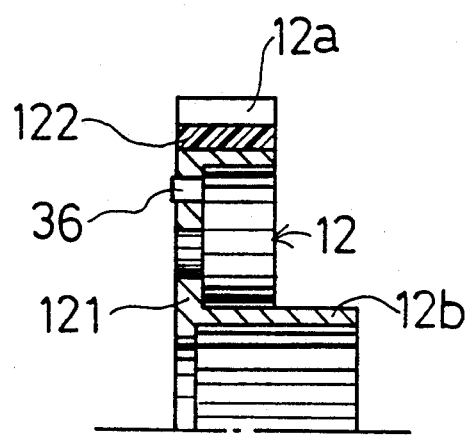
FIG. 7 is a sectional view of the worm wheel gear.
Figure 8:
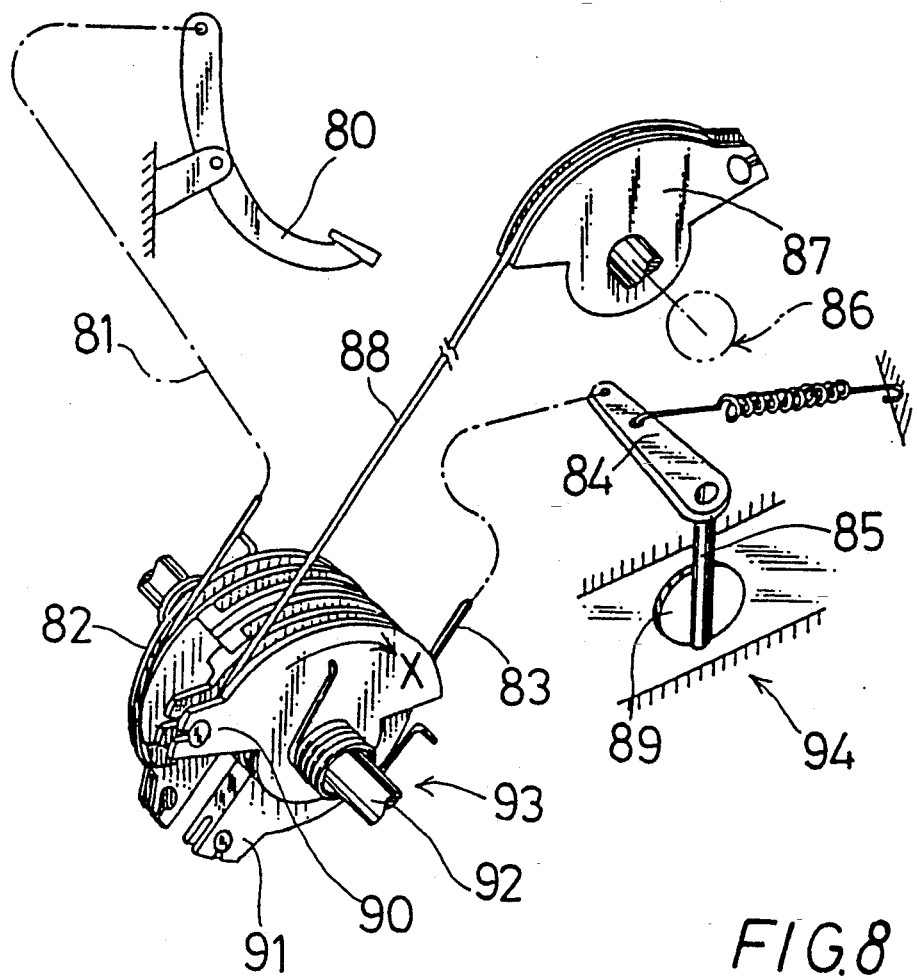
FIG. 8 is a schematic view of a prior art arrangement.

In this embodiment, the worm wheel gear 12 of the electromagnetic clutch 29 connected through a gear train to the output shaft of the actuator 22 is composed of a metal disc portion 121 made of a magnetic material and a toothed portion 122 of a synthetic resin provided around the outer periphery of the disc portion 121 and having gear teeth 12a. FIG. 6 is a side view of a part of the worm wheel gear 12, and FIG. 7 is a sectional view thereof.

The magnetic material for the disc portion 121 may be, for example, carbon steel. The synthetic resin for the toothed portion 122 may be, for example, polyacetal.

As the worm wheel gear 12 of this embodiment is composed of the metal disc portion 121 and the synthetic resin toothed portion 122, the gear 12 can complete a magnetic circuit of the electromagnetic clutch 29 and is also effective to reduce the coefficient of friction with respect to the worm gear 2 of the actuator 22. The path of magnetic flow is shown in an alternate long and short dash line A.

While the invention has been described with reference to preferred embodiments thereof, it is to be understood that modifications or variations may be easily made without departing from the scope of the present invention which is defined by the appended claims.

What is claimed is:

1. A throttle body having an autodrive actuator assembled thereto, the throttle body comprising;
    an arm secured to a throttle shaft of a throttle valve for adjusting the amount of intake air into an engine;
    an arm spring for biasing the arm in a valve-closing direction;
    an accelerator lever rotatably mounted on the throttle shaft and having an accelerator wire connected thereto so as to transmit the amount of depression of an accelerator pedal;
    an accelerator lever spring for biasing the accelerator lever in the valve-closing direction;
    first engaging means engageable when the accelerator lever is rotated in relation to the arm from its initial position in a valve-opening direction;
    an electromagnetic clutch having input and output rotors rotatably mounted on the throttle shaft coaxially therewith and being brought in contact with and away from each other in response to energization and deenergization of a coil, respectively;
    an actuator operable in response to a control signal from a control circuit provided for constant speed drive of a vehicle to rotate the input rotor;
    a locking lever secured to the throttle shaft; and
    second engaging means engageable when the output rotor is rotated in relation to the locking lever from its initial position in the valve-opening direction.

2. The throttle body as defined in claim 1, wherein the input rotor comprises a worm wheel gear.

3. The throttle body as defined in claim 2, wherein the worm wheel gear is composed of a metal disc portion made of a magnetic material and a toothed portion made of a synthetic resin and provided around the outer periphery of the disc portion.

4. The throttle body as defined in claim 1, wherein the throttle shaft supports at an end thereof the arm and the accelerator lever, the other end of the throttle shaft extending through the electromagnetic clutch and supporting a throttle sensor.

* * * * *